Oct. 7, 1958 W. SHOCKLEY 2,855,524

SEMICONDUCTIVE SWITCH

Filed Nov. 22, 1955

INVENTOR
W. SHOCKLEY
BY
Arthur J. Torsiglieri
ATTORNEY

United States Patent Office 2,855,524

Patented Oct. 7, 1958

2,855,524

SEMICONDUCTIVE SWITCH

William Shockley, Fullerton, Calif., assignor to Bell Telephone Laboratories, Incorporated, New York, N. Y., a corporation of New York Application November 22, 1955, Serial No. 548,330

3 Claims. (Cl. 307—88.5)

This invention relates to circuit arrangements which include a semiconductive element and, more particularly, to such arrangements in which the semiconductive element is capable of two extremes of impedance characteristics so that it may be operated as a switch.

In the operation of a variety of electrical systems, there is need in a transmission path for a connecting link which can be transferred readily and reliably from a high impedance condition, in which it adds appreciable attenuation in the transmission path and so limits the current therethrough to a low value, to a low impedance condition in which it adds inappreciable attenuation in the transmission path and so permits large amounts of current to flow.

In telephone switching systems, for example, there is generally utilized a plurality of crosspoint switches to control the characteristics of transmission paths between a number of possible input and output lines. In particular, it is desirable in some recently developed systems of this type, such as that disclosed in United States Patent 2,684,405, granted July 20, 1954, that the crosspoint switches utilized for establishing connections through the switching network between selected input and output lines also form parts of the talking path.

It will be convenient to describe the principles of the present invention with specific reference to the embodiment of the present invention in crosspoint switches suited for such purposes, although it will become obvious that switches in accordance with the invention will be suited for a wide variety of other uses.

Switches suited for inclusion in telephone switching systems of the kind described should have operating characteristics which are reproducible not only from switch to switch but from one measurement to another in the same switch. Still further, such switches should be simple and relatively inexpensive since large quantities are required. Additionally, in the interest of high switching speeds the switch should respond quickly to triggering signals.

A broad object of the invention is to provide a switch in which the desiderata set forth above are realized as fully as possible.

A more specific object is to improve switching systems by providing a crosspoint switch especially suited for incorporation therein.

An object related to this last mentioned object is to provide a semiconductive switch which is rugged and reliable, yet easy to fabricate and convenient to interconnect into a switching system.

In particular, an object of the invention is to provide a reliable semiconductive switch which is a simple two-terminal device and requires a minimum of associated circuitry.

To these ends, a feature of the invention is a diode switching element comprising a suitably dimensioned semiconductive silicon body having four zones arranged in succession, contiguous zones being of opposite conductivity type, and including electrical connections to only the two end zones, the two intermediate zones being allowed to float.

Such a diode switching element is not only a two-terminal device but is one in which only two electrical connections to the body in all are required. In this important respect, such an element differs from previously known switches of the kind shown in United States Patent 2,655,610 which issued on October 13, 1953. A switch of the kind there described also comprises a semiconductive body having four zones arranged in succession, of which contiguous zones are of opposite conductivity type, but it requires four electrical connections, one to each of the four zones, and associated external circuitry interconnected between pairs of the electrical connections. The increase in convenience which stems from the elimination of the electrical connections to the two intermediate zones of the semiconductive body and the external circuitry associated therewith can be better appreciated when it is realized that the intermediate zones of such a body typically are small fractions of an inch in thickness. Moreover, it is considerably easier to reproduce switches with identical characteristics when connections need to be made only to the two ends of the semiconductive body and associated external circuitry is not required.

It is characteristic of a switch in accordance with the invention that the semiconductive silicon body included therein is designed so that the triggering action employed results in a change in the effective alpha of the body from a value which is less than unity to a value which becomes unity, where the effective alpha of the body is defined as the sum of the inherent alphas of the two intermediate zones and the inherent alpha of each intermediate zone is defined as the ratio of the current change across the collecting junction of the zone to the current change across the emitting junction of the zone if the potential across the collecting junction were held constant. A body of the kind described exhibits between the terminal connections to its two end zones a high impedance when its effective alpha is less than unity and a low impedance when its effective alpha equals or exceeds unity.

For operation as a switch, there is applied between the two terminal connections to the body of the kind described a voltage whose polarity is such as to bias in reverse the rectifying junction which exists between the two intermediate zones. Under such conditions, before being triggered, the element exhibits between its two terminals the impedance of the reverse-biased rectifying junction which generally is very high. The element is triggered to a low impedance state typically by temporarily increasing the voltage applied across its two terminals beyond a predetermined switching value, which results in a breakdown of the reverse-biased rectifying junction and a sharp decrease in the impedance which is viewed across the two terminals of the element. This low impedance state persists so long as the voltage applied is sufficient to insure the flow of a predetermined sustaining current through the body. In such low impedance state, the voltage needed to sustain such current flow is appreciably less than that needed to initiate the switching action.

Behavior in the manner described is attributable to the fact that the impedance state of the element depends on the effective alpha of the body, which is given by the sum of the inherent alphas of the two intermediate zones, and the values of the inherent alphas of the intermediate zones are made to depend on the level of the carrier density in the various zones of the body. Since an increase in carrier lifetime with an increase in current density in any region will increase the inherent alpha for the proximate intermediate zone, an increase in lifetime with increasing carrier density will result in an increase in effective alpha of the body with increasing current density. Before breakdown of the reverse-biased intermediate rectifying junction, the carrier density in the body is low, and so the inherent alpha of each intermediate zone is low and the effective alpha of the body is such as to result in a high impedance state. After breakdown of the intermediate junction, the carrier density in the body is high and so the inherent alpha of each intermediate zone increases until the effective alpha of the body reaches unity, at which point the body switches quickly to a low impedance state. Moreover, once the inherent alphas of the two intermediate zones become high and the current flow appreciable, the action becomes self-sustaining and the diode continues in its low impedance state.

In an illustrative embodiment of the invention, a PNPN monocrystalline silicon body having electrical connections to only its two end zones serves as the semiconductive diode. The body is made to have an effective alpha which depends on the current density in the body and which approaches unity when such current density reaches a preset value. Associated with the semiconductive diode is an external circuit which includes a voltage supply for biasing in reverse the intermediate rectifying junction in the body. Switching action is achieved by varying under the control of signal information the current density in the body.

The invention will be better understood in the following more detailed description taken in conjunction with the accompanying drawings in which.

Figure 1:
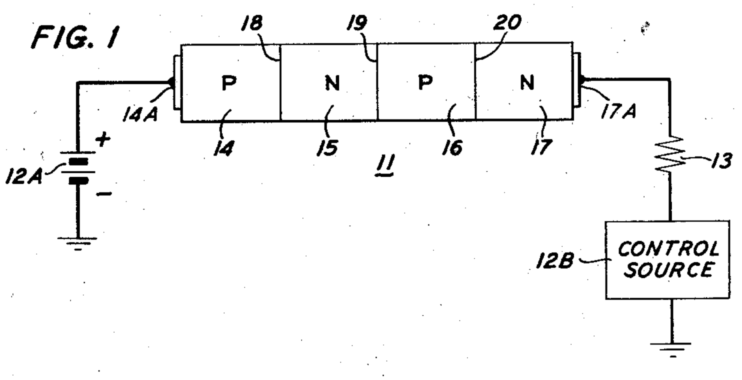
Fig. 1 shows a circuit arrangement incorporating a switch of the kind in accordance with the invention.

With reference now more particularly to the drawings, in the circuit arrangement shown in Fig. 1, a diode element 11 is connected in series with a voltage supply 12A, a source of control voltage 12B, and utilization apparatus represented schematically by the resistor 13 whose resistance is large relative to the series resistance of the diode element when it is in its low impedance state.

The diode element 11 comprises four zones 14, 15, 16 and 17 in succession, contiguous zones being of opposite conductivity type whereby there results the p-n-p-n structure illustrated including rectifying junctions 18, 19 and 20, respectively. Electrodes 14A and 17A are provided to make low resistance connection to the two end zones 14 and 17, by means of which electrical connections are made to such zones. The two intermediate zones 15, 16 are left floating, no electrical connections being made thereto.

The semiconductive body advantageously is of monocrystalline silicon. The specific details of one manner of fabrication of semiconductive elements of this type will be set forth hereinafter.

As is shown in the drawing, the voltage supply 12A is connected so that there is established a reverse bias across the rectifying junction 19. The level of the voltage applied by the supply 12A is made insufficient to cause breakdown of this junction 19 in the normal quiescent condition of the element 11.

It is found that the short circuit current which flows through the diode element 11 is approximately given by:

$$\frac{I_{co}}{1-(\alpha_1+\alpha_2)}$$

where $I_{co}$ is the reverse saturation current the junction 19 would have if junctions 18 and 20 were short-circuited by noninjecting connections, and $\alpha_1$ and $\alpha_2$ are the inherent alphas of the intermediate zones 15 and 16, respectively. The element 11 is prepared so that at least one of the intermediate zones has an inherent alpha which increases with increasing carrier density. Advantageously, this is achieved by having at least one zone in which the lifetime increases with increasing carrier density. It is also important that the inherent alphas of the two intermediate zones be low at low carrier densities. When this condition is met, before breakdown of the intermediate junction 19 when the reverse saturation current is small and the carrier density in the body low the inherent alphas of the two intermediate zones and the effective alpha of the body are small. As a consequence, only a small current will flow through the element 11, and the element essentially acts as an open switch in the circuit.

To close the switch and make possible appreciable current flow in the circuit, there is superimposed on the voltage which exists across the diode element 11 by reason of the voltage supply 12A a voltage pulse, which is applied by the control source 12B, of sufficient amplitude that the net voltage across the diode element is such as to result in breakdown of the junction 19. By appropriate design of the body in accordance with principles known to workers in the art, the breakdown voltage may be adjusted to a desired value. A value of 30 volts is typical for initiating breakdown in a silicon body.

After breakdown, the current density in the body is high and, accordingly, the inherent alphas of the intermediate zones increase until the effective alpha of the body reaches unity, at which point the potential across the center junction 19 either drops to zero or reverses sign and the impedance of the element becomes substantially that of p–n junctions in the forward direction. Under these circumstances, the maximum current which will, in fact, flow is determined primarily by the associated circuitry.

As previously discussed, it is found possible to sustain the breakdown condition in the diode element 11 with a voltage appreciably less than that needed to initiate it.

Figure 2:
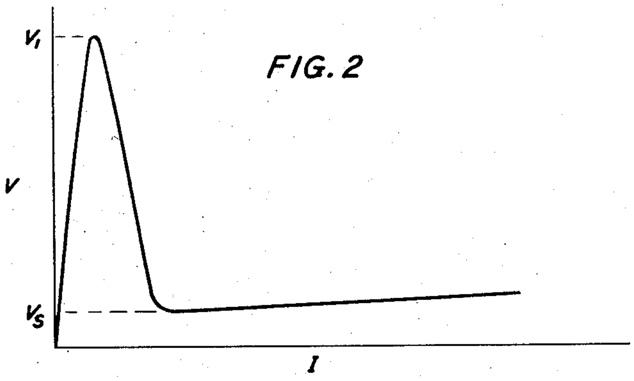
Fig. 2 is a plot of the current-voltage relationship of the switch shown in Fig. 1.

In Fig. 2 there is plotted the voltage appearing across the terminals of the diode element 11 against the current flowing in the circuit shown in Fig. 1. Low current flows, corresponding to the high impedance state of the element, until the breakdown voltage $V_1$ is reached. There then follows an unstable negative resistance region in the voltage-current characteristic. Next, there follows a region in which although the current flow is appreciable, only a small voltage appears across the element corresponding to the low impedance state of the element. In this region, the major portion of the voltage applied by the supply is developed across the circuitry associated with the element.

After breakdown has been initiated, the breakdown condition will be sustained if there is maintained across the element sufficient voltage to insure the flow of the sustaining current. If the voltage applied is lowered beyond this value $V_S$, the element returns to its high impedance state and remains in such state until the breakdown initiating voltage $V_1$ is again reached.

Accordingly, for restoring the element 11 to its high impedance state, the control source 12B is adapted to apply pulses of polarity such that the resultant voltage appearing across the element 11 is less than the sustaining voltage. Alternatively, by opening the circuit or otherwise reducing the current flow therein below the value needed to sustain the breakdown, the element 11 may be switched from its low impedance state back to its quiescent high impedance state.

It is important for operation in the manner described that the effective alpha of the body increases from a low value at low carrier densities to a higher value at higher carrier densities. It has been found that bodies prepared of monocrystalline silicon in the manner to be described exhibit this characteristic strongly. Without intending that the explanation to be propounded be construed as limiting, it is thought that this phenomenon can be attributed essentially to two factors. First, it is believed that there is surface leakage which acts as a shunt path at low injection levels where the impedance of the emitting junction is high. The effect of this shunt path is reduced at high minority carrier densities where the impedance of the emitting junction is low. Current flowing through this shunt path detracts from the inherent alpha of the intermediate zone whose emitting junction it is bypassing. Additionally, it is thought that recombination centers are present generally throughout the body but in at least one of the zones, and these centers result in the continuing recombination of a certain number of the injected minority carriers but which gradually become saturated with increasing injection level and so have a diminished overall influence when the injection level is high. Material exhibiting such properties may be described as having a lifetime which increases with increasing injection level. Whatever the cause, material which will exhibit the desired effect is readily available and the presence of the effect can readily be ascertained by simple measurements known to workers in the art. Moreover, the addition of iron or plastic deformation are known techniques for introducing recombination centers in silicon.

It is also feasible to employ light or other means capable of forming electron-hole pairs for use as the switching information to provide the triggering action. Light incident on the intermediate rectifying junction 19 of the diode element 11 in the circuit shown in Fig. 1 results in the formation of hole-electron pairs which add to the dark reverse saturation current and accordingly increase the current density in the body. If the light intensity is such that the current density is increased sufficiently that the effective alpha of the body reaches unity, the diode element will be triggered from its quiescent high impedance state to a low impedance state. It will remain in this condition, even after the light is removed, until the current flowing through the element is made to fall below the sustaining current, as by opening the external circuit or in any way reducing the voltage applied across the two terminals of the element below the sustaining voltage. A device of this kind provides a rugged yet sensitive photoswitch which is capable of passing large currents in its low impedance state. As such, it may be used in a photosensitive control system with a minimum of auxiliary equipment.

A typical element of the kind described was made as follows: Silicon which was prepared by the zinc reduction of silicon tetrachloride and purchased from the Du Pont Corporation as Hyperfine Silicon, lot No. HP–216, was melted in a quartz crucible in a radio-frequency induction furnace which employed a graphite susceptor. A monocrystalline silicon ingot was grown therefrom in accordance with the technique described in United States Patent 2,683,676 which issued to J. B. Little and G. K. Teal on July 13, 1954. In particular, in the growing process, the seed crystal used to initiate the growing had an orientation in the 111 direction and the pulling rate was varied gradually from 2 mils per second to 1 mil per second to keep the crystal diameter substantially uniform over the major portion of the crystal length. During pulling, the seed was rotated at a rate of approximately twelve revolutions per minute. The atmosphere in which the crystal was grown was essentially of helium. The silicon melt was doped before pulling with arsenic-doped silicon having a specific resistivity of .004 ohm-centimeter to make the crystal grown of n-type conductivity.

After the monocrystalline silicon ingot had been prepared a diamond saw was used to cut a slice thereof, and from it there was lapped to size with silicon carbide abrasives a wafer 100 mils square and 20 mils thick. The wafer was etched briefly to remove the damaged surface material in a mixture of nitric and hydrofluoric acids in the manner known to workers in the art for such purposes. The resulting wafer was n-type with a specific resistivity of 2.5 ohm-centimeters.

Thereafter, the silicon wafer was sealed in a quartz tube in an atmosphere of helium of about 1 micron of mercury pressure along with some antimony oxide. The tube was kept heated to a temperature of 1260° C. for about one and one-quarter hours. The tube was then cooled and broken open and the wafer removed and sealed in a fresh quartz tube in an atmosphere of helium again of about 1 micron of mercury pressure along with aluminum metal. The tube was then heated for twenty minutes at 1260° C. and thereafter broken open for the removal of the wafer.

The result of the two heating operations described was the formation of an n-p-n-p-n structure of which the middle n-type zone was by far the thickest since neither the aluminum nor antimony had been diffused more than a fraction of a mil deep. Under the prescribed conditions, antimony has a higher solubility in the silicon wafer than aluminum but a much slower rate of diffusion. As a consequence, the aluminum diffused in the second operation penetrated deeper into the wafer than did the antimony first introduced and the difference in depths of penetration of the aluminum and antimony essentially fixed the thicknesses of the p-type zones, and the depth of penetration of the antimony essentially fixed the thicknesses of the n-type terminal zones. The general principles of dual diffusion of the kind described are set forth in greater detail in copending application Serial No. 516,674, filed June 20, 1955, by C. S. Fuller and M. Tanenbaum.

The silicon wafer was thereafter mounted in a suitable jig and an aluminum film was evaporated over an area 2 mils by 6 mils on one broad face thereof to a thickness of approximately 50,000 Angstroms. The thickness of the film evaporated is chosen so that during the alloying step to follow the aluminum cannot penetrate completely through the substrate n-type zone. The wafer was then removed from the jig and placed in a vacuum furnace. The deposited aluminum was then alloyed to the wafer by a heating cycle which included raising the temperature of the furnace gradually over approximately 10 minutes to 850° C., maintaining this temperature for another 10 minutes, and lowering the temperature to room temperature gradually over another 10 minutes. The result of this alloyage was to form on the corresponding surface of the body a p-type surface zone. The wafer accordingly at this point was of p-n-p-n-p-n configuration, of which the middle n-type zone was still by far the thickest. Of this structure the aluminum-alloyed p-type surface zone of the body was to form one of the end zones of the desired structure and the bulk n-type intermediate zone was to form the other end zone.

To this end, the surface of the wafer corresponding to the aluminum-alloyed portion and the closely surrounding region was masked with wax and the surface of the body etched by dipping the wafer in a mixture of nitric and hydrofluoric acids. By this treatment, the unwanted p- and n-type zones at one end of the wafer were etched away to expose the bulk n-type zone. The wax was then removed from the aluminum-alloyed surface zone and an electrical connection made thereto. In practice it was found suitable for making a low resistance connection thereto to employ a tungsten wire held in pressure contact. For making electrical connection to the bulk n-type zone, a gold-antimony plated tab was alloyed thereto in the manner known to workers in the art. It is, of course, feasible to make the ohmic connections to the surface p- and n-type zones in any of the ways known to workers in the art. The thicknesses of the various zones of the p-n-p-n element described were approximately .1 mil, .05 mil, .15 mil and 19 mils, respectively.

Various other techniques may be employed for forming a p-n-p-n body. For example, the process described above may be modified by the substitution for the aluminum-alloy step of the diffusion of boron selectively into a portion of one surface of the body for forming the terminal p-type zone desired. In this case, the parameters of this diffusion step are chosen so that the boron will penetrate into the antimony-rich zone only enough to form the desired p-type terminal zone and to result in a conversion of conductivity-type in the region of penetration.

In practice, it is found that the series resistance of the diode element in its low impedance state is primarily determined by the ohmic resistances of the two terminal zones. Accordingly, to keep this series resistance low, it is desirable to construct the diode element in a manner that results in low resistance terminal zones.

To this end, an alternative process that may be employed to fabricate a suitable p-n-p-n structure is to take a p-type wafer prepared in the manner previously described and to heat it in the presence of the vapor of antimony oxide to form an antimony-rich n-type skin on the body. Into the surface of this body, there is then diffused boron in a second heating step to reconvert the surface of the body to p-type without complete penetration of the substrate antimony-rich zone. Then the edges of the body and the back face are etched to leave a p-n-p-n structure in which the terminal p-type zone is boron-rich and the terminal n-type zone is antimony-rich.

Moreover, this last-described process may be modified to substitute for the boron-diffusion step an aluminum-alloying step for forming the terminal p-type zone.

Figure 3:
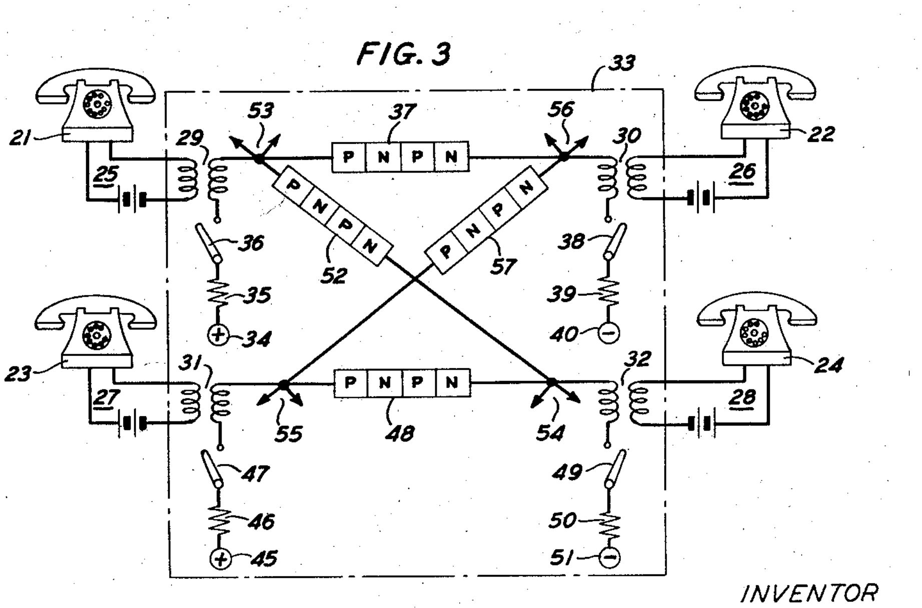
Fig. 3 shows schematically a simple telephone switching network employing switches in accordance with the invention as crosspoint switches.

In Fig. 3, there is shown in greatly simplified form a telephone system which utilizes a switching network in which semiconductive diodes of the kind described are utilized as talking path cross point switches. Crosspoint switching networks, as such, are well known as is exemplified by the patent to E. Bruce et al., identified above. Briefly, such a network provides means whereby a plurality of information stations may be placed in communicating relation with any of a further plurality of such stations by the selective operation of one or more crosspoint switches connected therebetween. In Fig. 3, substations 21, 22, 23 and 24 are each connected through associated subscriber loops 25, 26, 27 and 28, which include the primary windings of transformers 29, 30, 31 and 32, respectively, to a crosspoint switching network 33.

For the purpose of facilitating the explanation, crosspoint switching network 33 is shown as having only a single stage comprising four crosspoint switching circuits for enabling either of substations 21 and 22 to be connected to either of substations 23 and 24. In practice a much larger number of crosspoint switching circuits will be usual to enable communication paths to be completed between selected pairs of a larger number of substations. Additionally, the crosspoint switching network ordinarily will be located in a central office, or in a remote line concentrator between the subscriber stations and a central office.

The illustrative switching network 33 comprises a first transmission circuit which includes in series a source of potential 34, a resistor 35, a switch 36, the secondary winding of the transformer 29, a semiconductive diode element 37 of the type described, the secondary winding of the transformer 31, a switch 38, a resistor 39, and a source of potential 40.

Crosspoint switching network further comprises a second transmission circuit similar to the first transmission circuit just described, which includes in series, potential source 45, resistor 46, switch 47, the secondary winding of transformer 30, the semiconductive diode element 48, the secondary winding of transformer 32, switch 49, resistor 50, and potential source 51.

Semiconductive diode element 52 is connected between terminals 53 and 54 and semiconductive diode element 57 is connected between terminals 55 and 56.

The polarities of potential sources 34, 40, 45 and 51 are as shown so that the potentials applied to the semiconductive diode elements serve to bias the intermediate rectifying junction of each in reverse.

In the operation of a system of the kind described, either of substations 21 or 22 may be connected to either of the substations 23 or 24 by activation of the appropriate switching circuit. For example, with all of switches 36, 38, 47 and 49 open, no potentials are applied across the semiconductive diode elements, and the substations remain isolated from one another. In practice, the role of these switches may be served by marking pulses in the manner known to workers in the telephone switching art. To connect substation 21 to substation 23, switches 36 and 38 associated therewith are closed, and this results in the aplication of the sum of the potentials of sources 34 and 40 on the semiconductive diode element 37, which sum is sufficient to initiate breakdown of the intermediate rectifying junction of the diode element 37. As a consequence, it is switched from its quiescent high impedance state to a low impedance state and a low attenuation communication path is formed between substations 21 and 23.

In a similar fashion, interconnection between substation 21 and substation 24 may be provided by closing switches 36 and 49. Additionally, interconnection of substation 22 with either substation 23 or 24 may be effected in an analogous manner.

It should be apparent that the semiconductive diode switching elements disclosed herein with specific reference to crosspoint switching networks should find equally advantageous use in a large variety of networks wherein there is need for a reliable rugged fast acting switch.

Moreover, it should also be apparent that the element may be of semiconductive material other than silicon as described specifically. Germanium, germanium silicon alloys, group III–group V compounds can be employed, if the intermediate zones of the semiconductive body are made to have alphas which vary in the manner previously described.

What is claimed is:

1. A switch comprising a substantially monocrystalline silicon body including four zones arranged in succession, contiguous zones being of opposite conductivity type, at least a portion of the body including a high concentration of recombination centers whereby the effective alpha of the body is substantially below unity for low values of current density and substantially unity for higher values of current density, and electrode connections to only the first and fourth zones of the succession, the intermediate two zones being floating.

2. A switching arrangement including a switch in accordance with claim 1 in further combination with switching control means including potential means for biasing in reverse the rectifying junction intermediate between the two intermediate zones of the succession.

3. A switch comprising a monocrystalline p-n-p-n silicon body and electrical connections to only the two terminal zones of the body, the intermediate two zones being floating, characterized in that the silicon body includes a high concentration of recombination centers whereby the effective alpha of the body is substantially below unity for a current density in the body below a predetermined switching level and approaches unity for a current density in the body above the predetermined switching level.

References Cited in the file of this patent

UNITED STATES PATENTS

| | | |
|---|---|---|
| 2,588,254 | Lark-Horovitz et al. | Mar. 4, 1952 |
| 2,655,610 | Ebers | Oct. 13, 1953 |